(12) United States Patent
Fukasawa

(10) Patent No.: US 7,859,193 B2
(45) Date of Patent: Dec. 28, 2010

(54) ILLUMINATION APPARATUS

(75) Inventor: Koichi Fukasawa, Fujiyoshida (JP)

(73) Assignee: Citizen Electronics Co., Ltd., Yamanashi (JP)

( * ) Notice: Subject to any disclaimer, the term of this patent is extended or adjusted under 35 U.S.C. 154(b) by 211 days.

(21) Appl. No.: 11/908,274

(22) PCT Filed: Mar. 1, 2006

(86) PCT No.: PCT/JP2006/303830

§ 371 (c)(1),
(2), (4) Date: Mar. 9, 2009

(87) PCT Pub. No.: WO2006/095609

PCT Pub. Date: Sep. 14, 2006

(65) Prior Publication Data

US 2009/0200957 A1     Aug. 13, 2009

(30) Foreign Application Priority Data

Mar. 10, 2005   (JP)   ............................. 2005-068183

(51) Int. Cl.
*H05B 37/02* (2006.01)
(52) U.S. Cl. .................... 315/158; 315/149; 315/281; 315/307; 315/169.3
(58) Field of Classification Search ... 315/169.1–169.4, 315/291, 307, 224, 185 S, 149, 151, 157–159; 313/498, 499, 492, 538, 539, 523, 483, 524, 313/527, 526, 531, 542, 543, 544, 112–114, 313/116, 613–616
See application file for complete search history.

(56) References Cited

U.S. PATENT DOCUMENTS

| 5,998,925 | A | 12/1999 | Shimizu et al. |
| 2003/0107656 | A1 | 6/2003 | Ito et al. |
| 2006/0001030 | A1 | 1/2006 | Okuwaki et al. |
| 2009/0149224 | A1* | 6/2009 | Yamazaki et al. ........... 455/566 |

FOREIGN PATENT DOCUMENTS

| JP | 52-45181 | 10/1977 |
| JP | 05-152609 | 6/1993 |
| JP | 5-63068 | 8/1993 |
| JP | 10-06522 | 3/1998 |
| JP | 2000-089318 | 3/2000 |
| JP | 2003-174587 | 6/2003 |
| JP | 2003-287783 | 10/2003 |
| JP | 2006-19598 | 1/2006 |
| WO | 1998/05078 | 2/1998 |

* cited by examiner

*Primary Examiner*—Tuyet Thi Vo
(74) *Attorney, Agent, or Firm*—Browdy and Neimark, PLLC

(57) ABSTRACT

The present invention relates to an illumination apparatus comprising an LED light source which includes an LED chip and a sealing member containing a fluorescent material therein and sealing the LED chip and is configured to illuminate an object, and a light-transmitting member provided in front of the LED light source, the LED chip being configured to make standby emission of light by application of a standby current during standby illumination of the object, the LED chip being controlled so that a color of the sealing member containing the fluorescent material is less visible from outside, and a current value of the standby current being controlled according to brightness of external light detected by an external light sensor to reduce power consumption.

9 Claims, 7 Drawing Sheets

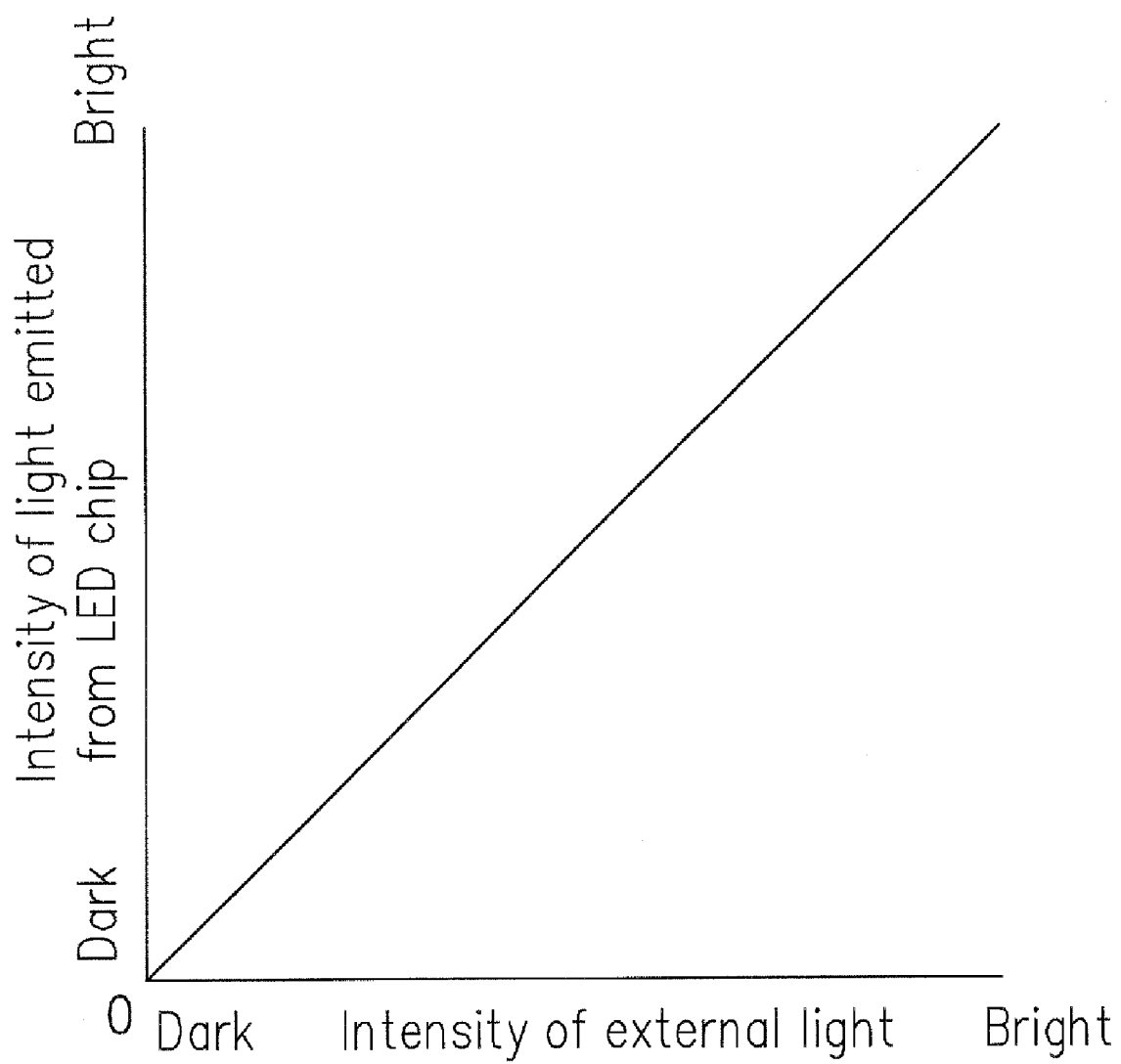

ILLUMINATION APPARATUS

TECHNICAL FIELD

The present invention relates to an illumination apparatus suitable for illuminating an object, more specifically to an illumination apparatus capable of illuminating a subject efficiently when the subject is photographed by a camera installed in an instrument such as a mobile phone or the like.

BACKGROUND ART

An illumination apparatus such as a flash light, for example, which illuminates a subject when the subject is photographed by a camera installed in an instrument such as a mobile phone or the like has been conventionally used. In such an illumination apparatus, it has been difficult to obtain white color illumination light by mixing light produced by light emitting diodes (hereinafter referred to as LEDs) of three primary colors, and therefore, a white light source in which a blue light emitting diode chip is sealed by a resin containing a phosphor such as yttrium aluminum garnet (hereinafter referred to as YAG) or the like has been used. However, because the YAG contained in the resin looks yellow and this yellow is considered to spoil design of an instrument, a semi-transparent member or member having low light transmission is provided in a window disposed in front of the white light source so that yellow color YAG does not become clearly visible. A technology to achieve white illumination light by adding a fluorescent material to a resinous mold of a blue light-type LED has also already been proposed (see Patent Document 1). In addition, a detailed review concerning selection of the added materials has also been made (see Patent Document 2).

However, use of the semi-transparent member mounted on the front window of the LED gives rise to a problem that light emitted from the LED is attenuated through diffusion, absorption and reflection or the like by the semi-transparent member. It is required to consider the attenuation rate of the light to be 50 to 80%, with the result that LED has very low illumination efficiency. Also, it is said to be ideal for an illumination apparatus that illumination width of light should be within ±30 degrees to light axis. However, in this apparatus, particles contained in the member for the window being semi-transparent scatter light emitted from the LED light source. As a result, even if a light focusing system such as a reflector, lens and so on is provided with the LED light source, light focusing effect cannot be fully achieved and illumination width tends to be wider than the ideal width. This is explained below, referring to FIG. 5 showing a conventional subject illumination apparatus.

The illumination apparatus includes an LED light source 30 disposed in a casing 22 of an instrument, as shown in FIG. 5. The LED light source 30 includes a substrate 16, a blue LED chip 10 mounted on the substrate, a frame 12 which is attached to the substrate 16 to surround the blue LED chip 10 and has on an inner surface thereof a mirrored reflection surface, and a sealing member 14 which contains a YAG phosphor and has a convex lens-shaped surface. The LED light source 30 is connected to a mother board 20 of the instrument by a solder 18. A semi-transparent window 40 is provided in the casing 22 of the instrument to face a front surface of the LED light source 30. The window 40 has a light transmission rate held down to within 20 to 50% such that yellow of the sealing member 14 is not visible.

Exit light 42 emitted from the LED light source 30 is absorbed in and reflected on the semi-transparent window 40, and only 20 to 50% of the exit light is emitted to the outside of the instrument. In addition, because the exit light is scattered by particles which make the window semi-transparent, as shown by dashed lines, the light is scattered through a range wider than an ideal range of about ±30° to an optical axis. This results in a low efficiency of light illuminating the subject.

It should be noted that there has also been proposed a technology to resolve a problem that light emitted from the blue LED chip 10 is also scattered by the YAG particles in the sealing member 14. By setting an angle of the mirrored reflection inner surface of the frame 12, the scattered light can be reflected in a predetermined direction. Also, by disposing the sealing member 14 in the frame 12, the sealing member 14 does not project from the frame 12 (see Patent Document 3).

A similar technology to this is disclosed in Patent Document 4. The technology has a structure in which a half-mirror processing is applied to a front window of an LED light source, and the window is disposed adjacent to an image pickup device so that a person who is a subject can know the orientation of a camera by way of checking an image reflected on the window. The fact that "a supplementary light source disposed opposite to the subject on a half-mirror surface is not visible from the outside" is disclosed in paragraph 0007 of Patent Document 4.

However, when the half mirror is formed by an almost completely transparent plate with a light transmission rate of 90%, the subject is not reflected on the window, and for the person as the subject to recognize an image of the subject on the half mirror, it is necessary to set the light transmission rate to be 50% or less. This may results in a large loss of light at the window, so that there is no significant difference between the technology proposed in Patent Document 4 and the conventional art mentioned in FIG. 5 regarding illumination efficiency. The increased costs of forming the half-mirror must also be taken into account.

[Patent Document 1]
  Japanese Patent Application Publication No. H5-152609
[Patent Document 2]
  WO98/05078
[Patent Document 3]
  Japanese Patent No. 2998696
[Patent Document 4]
  Japanese Patent Application publication No. 2003-287783

DISCLOSURE OF THE INVENTION

Problem to be Solved by the Invention

An object of the present invention is to provide an illumination apparatus including a light source with a good light-focusing property and a light-transmitting member with a high transmission rate, and capable of illuminating an object with high illumination efficiency.

Means to Solve the Problem

To accomplish an object above, an illumination apparatus according to one embodiment of the present invention includes a light source having a substrate, a light emitting diode chip mounted on the substrate and a sealing member which seals the light emitting diode chip and contains a fluorescent material, and a control device to perform standby illumination of the light emitting diode chip by applying a standby current to the light emitting diode chip during standby illumination, the control device includes an external light sensor to detect brightness of external light, a value of the standby current is controlled according to brightness of external light detected by the external light sensor, and the value of the standby current applied to the light emitting diode chip is controlled to have a larger value for brighter external light and a smaller value for darker external light.

Effect of the Invention

According to the illumination apparatus of the present invention, because the control device controls light-emitted from the light emitting diode chip by applying a small current to the light emitting diode chip in accordance with brightness of external light during standby illumination. Thus color of the sealing member containing the fluorescent material does not stand out when seen from the outside in a case of either under brighter external light or under darker external light. In this way, since the illumination apparatus according to the present invention is not required to use with a low-light-transmission-rate material disposed in front of its light emitting surface, it is possible to illuminate a subject through high-light-transmission-rate material instead.

BRIEF DESCRIPTION OF THE DRAWINGS

[FIG. 3B] is a graph explaining the control method shown in FIG. 3A.

BEST MODE FOR CARRYING OUT THE INVENTION

Preferred embodiments of the present invention will be explained in detail below with reference to the accompanying drawings.

Figure 1:
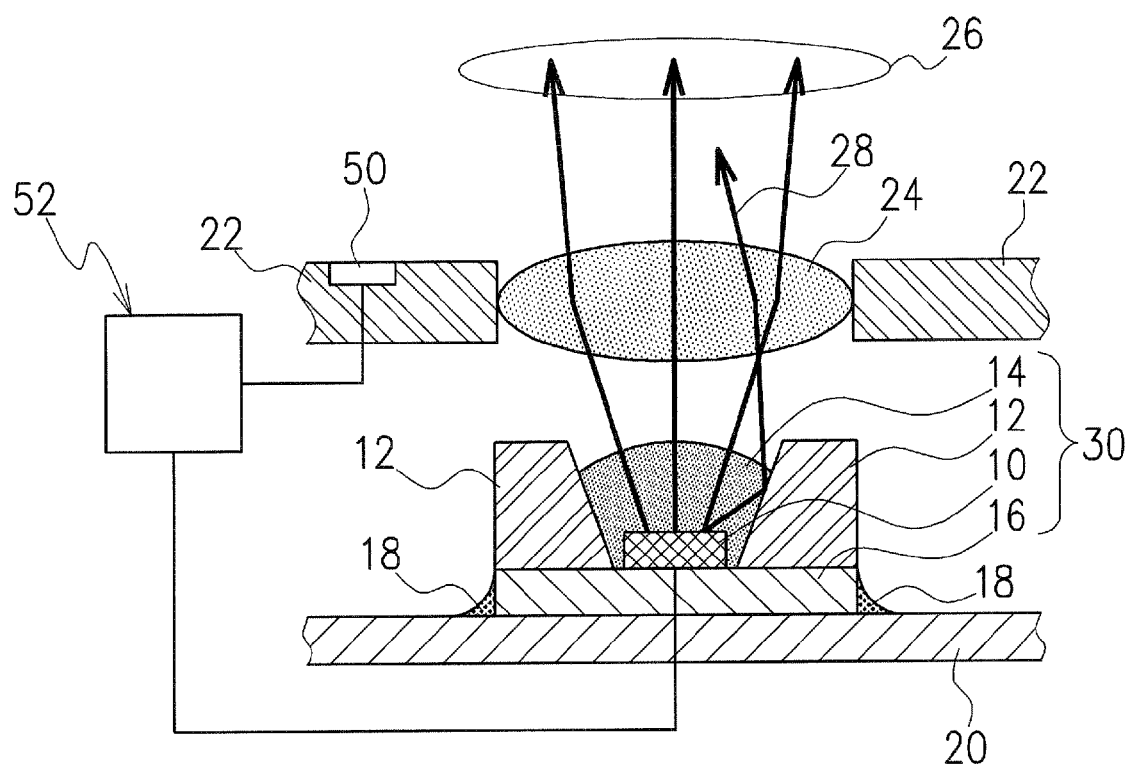
[FIG. 1] is a partially sectional view showing an embodiment of an illumination apparatus according to the present invention.
Figure 2:
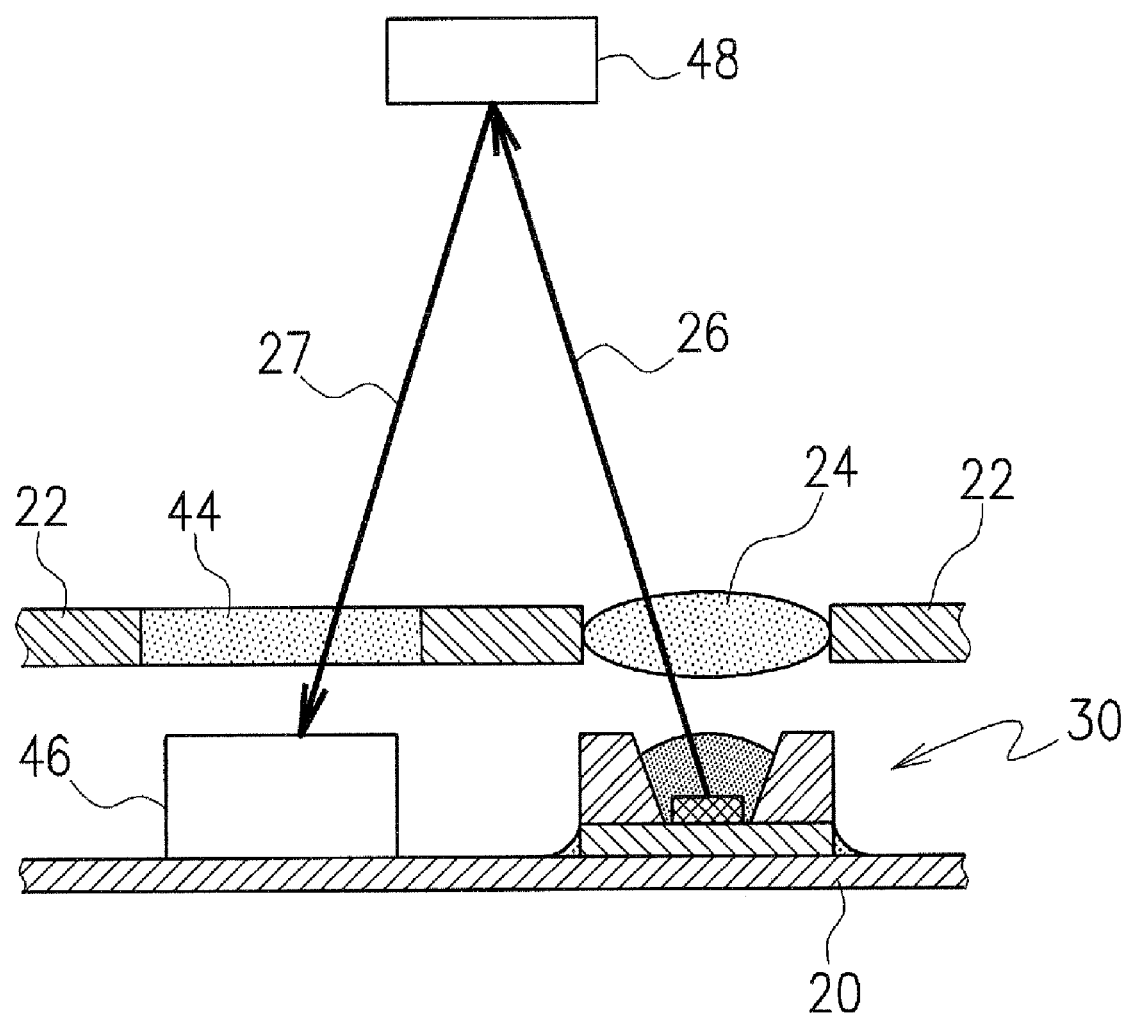
[FIG. 2] is a partially sectional view showing an embodiment in which the illumination apparatus according to the present invention is applied to a mobile phone.
Figure 5:
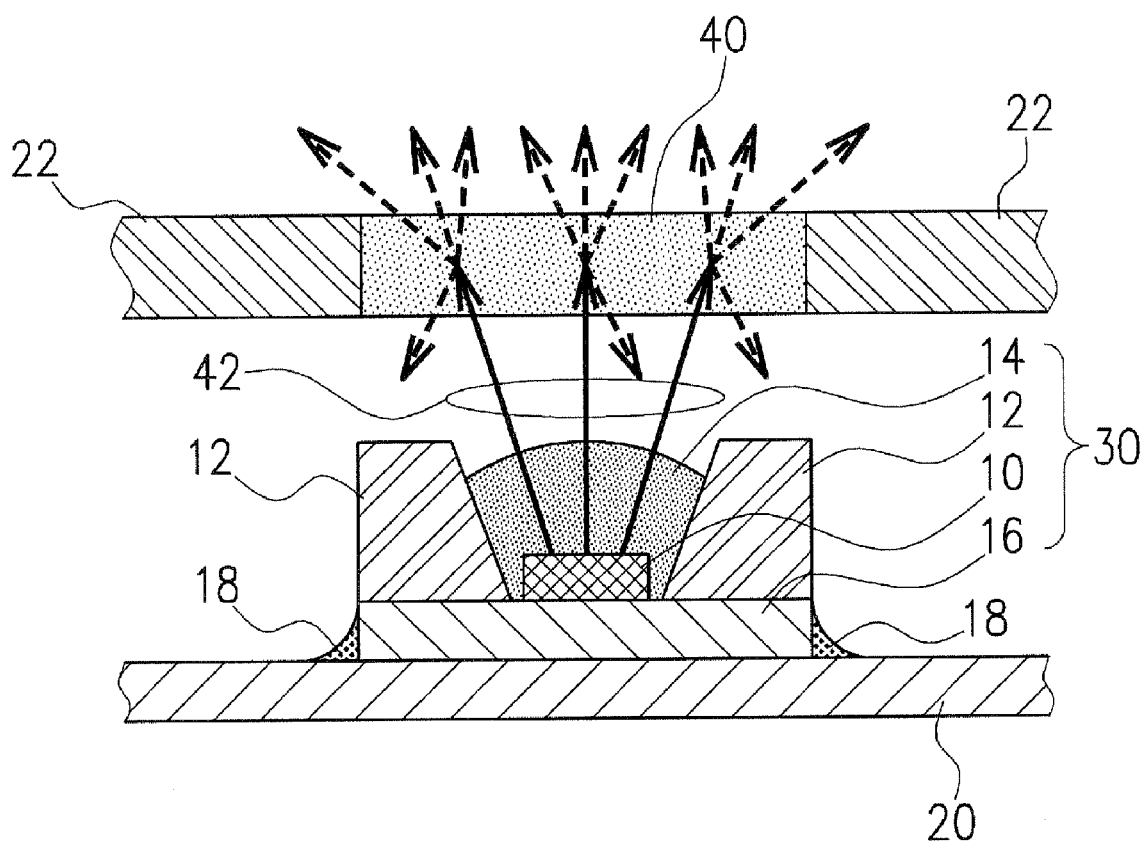
[FIG. 5] is a partially sectional view showing a conventional illumination apparatus.

FIGS. 1 and 2 show an embodiment in which an illumination apparatus according to the present invention is applied to, for example, an instrument such as a mobile phone with a camera (not shown), and a subject 48 (see FIG. 2) is illuminated when the subject is photographed by the camera. In FIG. 1, identical reference numbers are attached to parts similar to those in a conventional illumination apparatus configured to illuminate a subject, as shown in FIG. 5.

As shown in FIG. 1, the illumination apparatus includes a light source, or an LED light source 30 and a light-transmitting member 24 disposed in front of the front light emitting surface of the LED light source 30. The LED light source 30 is disposed in a casing 22 of the mobile phone. The LED light source 30 includes a substrate 16, an LED chip 10 mounted on the board, a frame 12 attached to the substrate 16, and a sealing member 14 disposed in the frame and made of a suitable resin. Here, the LED chip 10 is, for example, a blue LED chip and connected to the substrate 16 by face-down bonding. The substrate 16 and the frame 12 may be integrally formed through a lead frame or the like.

The frame 12 has an inverted truncated-cone-shape opening to surround the blue LED chip 10. A mirror-finish reflection surface to reflect light emitted from the blue LED chip 10 is provided on an inner circumferential surface of the opening in the frame. The sealing member 14 is disposed in the opening to seal the blue LED chip 10. A fluorescent material, for example, a YAG phosphor is contained in the sealing member 14. The sealing member 14 includes a convex lens-shaped light-focusing structure.

The LED light source 30 is mounted on a mother board 20 of the mobile phone, through, for example, a solder 18. A light-transmitting member 24 is disposed in the casing 22 of the mobile phone to face a front light emitting surface of the LED light source 30. The light-transmitting member 24 is semi-transparent in the illustrated embodiment and is attached to an opening provided in the casing 22 to form a window for the LED light source 30. The light-transmitting member 24 has a light transmission rate of 50% or more so that yellow of the sealing member 14 is less visible, and also, the light-transmitting member has a transparent convex lens-shaped light-focusing structure.

The illumination apparatus includes a control device 52 to electrically control the blue LED chip 10 to emit standby illumination and perform flash light, when the subject 48 is photographed. The control device 52 includes an external light sensor 50 to detect brightness of external light. The control device 52 is provided in the mobile phone, and the external light sensor 50 is provided, for example, in and below a front surface of the casing 22 and connected to the control device 52 (see FIGS. 1 and 3A).

The control device 52 is connected to the blue LED chip 10 (see FIGS. 1 and 3A), and controls the blue LED chip 10 so that the blue LED chip 10 emits a faint light (standby illumination) through application of a standby current thereto during standby illumination and so that a color of the sealing member 14 in which the fluorescent material is contained is least or not visible from the outside. This control is mentioned hereinafter. In this case, power consumption can be reduced by controlling a value of the standby current by way of a signal indicating the level of brightness of external light detected by the external light sensor 50.

FIG. 2 illustrates a state where the illumination apparatus is provided in a mobile phone with a camera and is in use. In FIG. 2, the camera installed in the mobile phone includes a photographic lens (not shown) and an image pickup device 46 to receive an image of the subject 48 thereon by way of the photographic lens. The LED light source 30 and the image pickup device 46 are mounted on the mother board 20 of the mobile phone, and exit light 26 emitted from the LED light source 30 passes through the light-transmitting member 24 having the light focusing structure which is provided in the casing 22 of the mobile phone to illuminate the subject. The image pickup device 46 receives the reflected light 27 reflected from the subject 48 through the window 44 to form the image of the subject 48 thereon.

Color of light emitted from the LED light source 30 is white because the light emitted from the blue LED chip 10 passes through the sealing member 14 containing the YAG phosphor to be emitted to the outside. Of the light emitted from the blue LED chip 10, some light 28 scattered on particles of the YAG phosphor within the sealing member 14 is reflected on the reflection surface of the frame 12 to be returned to a predetermined direction (see FIG. 1). The lights 26 and 28 which reach the light-transmitting member 24 pass therethrough with almost no diffusion, absorption, reflection and so on because the light-transmitting member 24 is transparent and has a high light transmission rate. Furthermore, because the light-transmitting member 24 has the light-focusing structure, the light is focused in the direction toward a target, as shown in FIG. 1.

In this way, in the illumination apparatus according to the present invention, because both the LED light source 30 and the light-transmitting member 24 have light focusing structures and because there is no light scattering material within the light-transmitting member 24, it is easy to set about exit light from the light-transmitting member 24 to be within an ideal angle of about ±30 degrees from an optical axis by a combination of both light focusing structures. It should be noted that, in the above-mentioned embodiment, the sealing member 14 and the light-transmitting member 24 have the convex lens-shaped light focusing structures, but that a similar result can be acquired even if a Fresnel lens is used, instead of the convex lens.

In the illumination apparatus, because the light-transmitting member 24 has a high light transmission rate of 50% or more and can focus light on the subject by means of the light focusing structure, the light emitted from the LED can be used two to five times more efficiently, when photographing or illuminating. Consequently, it is possible to extend a photographable distance for the same current used when taking a photograph. If a photographical distance is kept constant, it is possible to make a reduction in number of the three or four LEDs at present generally used in a conventional illumination apparatus, and hence to lower the production cost of the illumination apparatus.

Figure 3A:
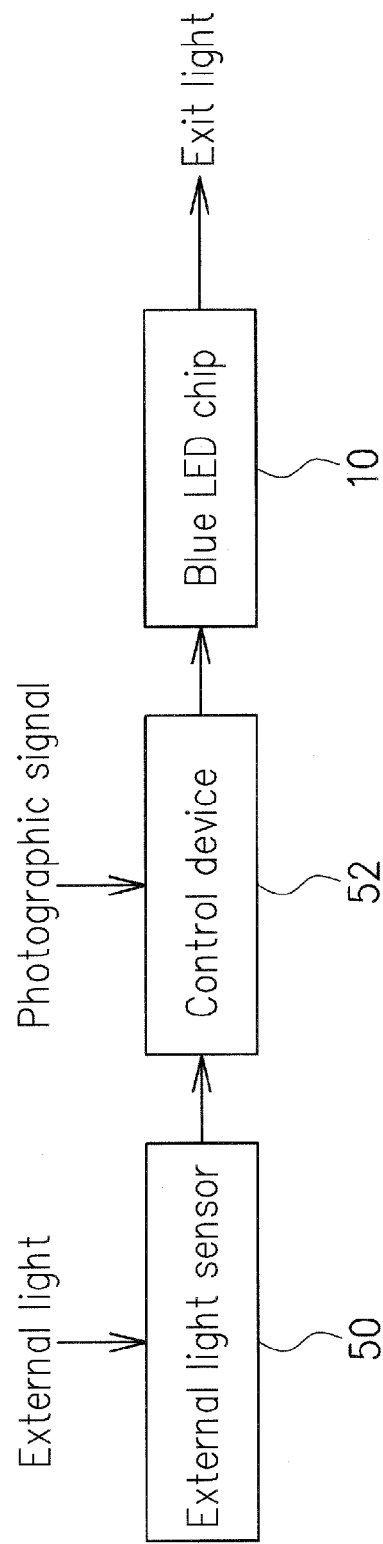
[FIG. 3A] is a block view explaining a control method of the illumination apparatus according to the present invention.

A method for controlling the blue LED chip 10 is explained specifically hereinafter with reference to FIGS. 3A and 3B. In FIG. 3A, the external light sensor 50 detects brightness of the environment in which the mobile phone is placed or light intensity of external light and sends a signal indicating the level of brightness of external light to the control device 52. The control device 52 generates an LED drive signal based on the signal indicating the level of brightness of external light and a photographic signal which is sent at the time a photograph is taken, and applies the LED drive signal to the blue LED chip 10. Thereby, the blue LED chip 10 emits light in response to the LED drive signal.

Here, the control device 52 is configured such that, when the photographic signal gives notice that the camera is to be used to take a photograph, it generates a drive signal such that light emitted from the blue LED chip 10 has maximum light intensity, and such that, when the camera is on standby, it generates drive signal such that a slight standby current is applied to the blue LED chip 10 so that the blue LED chip has a light intensity depending on the brightness of external light.

In this way, if the blue LED chip 10 is made to emit light during standby, the light appears white due to mixing of blue light emitted from the blue LED chip and yellow green light emitted by impingement of the blue light on the YAG phosphor. Consequently, even if a light-transmitting member 24 which is transparent and has a high light transmission rate is used, there is no danger that the yellow color of the sealing member 14 containing the YAG phosphor is not clearly visible through the light-transmitting member.

FIG. 3B is a graph showing light intensity of exit light of the blue LED chip 10 controlled according to light intensity of external light during standby. The blue LED chip is controlled so as to emit light of high light intensity in the case of bright external light, and of low light intensity in the case of dark external light. Such control is achieved by using a larger standby current under brighter external light, and a smaller standby current under darker external light. Basically, in a state when external light is extremely dark, such as, when the mobile phone is contained in its casing or the like, the blue LED chip 10 is controlled so that light emission is stopped.

Depending on purposes or how to use, it is a design accommodation to slightly modify values of the graph shown in FIG. 3B. For example, when the external light is less than a certain brightness, or to express the relationship between the light intensity of the exit light of the LED chip and the light intensity of the external light not as a linear function but as other functions, for example, as a quadratic function curve or as a nonlinear form. If the amount of the drive current of the LED chip is controlled in this way according to the amount of external light (environment light), influence on battery life duration can be minimized. Usually, this effect can be achieved with a current of a few 10 s of µA to 100 µA.

Figure 4A:
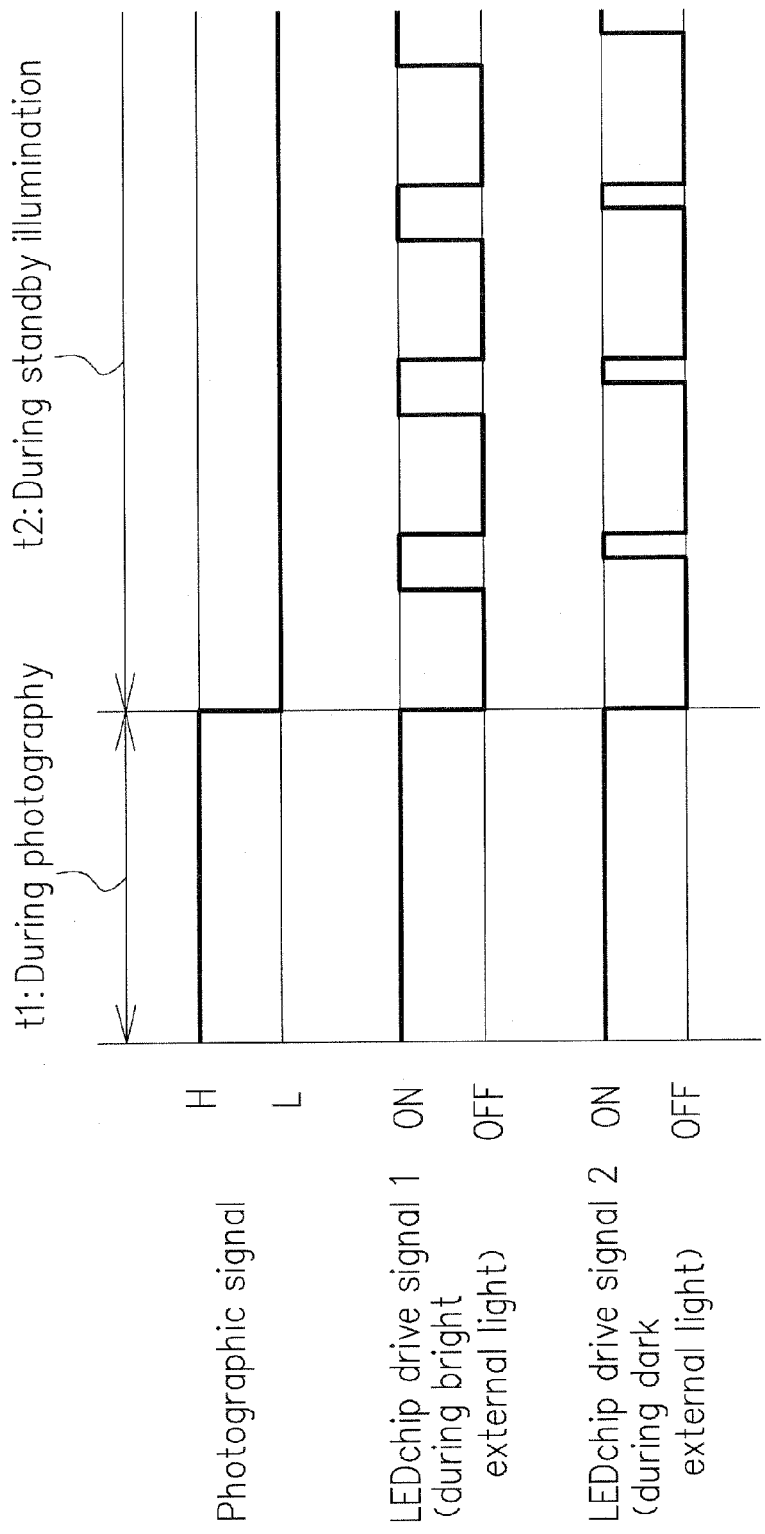
[FIG. 4A] is a time chart showing one example of a drive signal generated in an LED drive circuit.

FIG. 4A illustrates one example of the drive signal generated by the control device 52. In FIG. 4A, the photographic signal is at level H at the time t1 of photography and shows that the photograph is being taken. In this case, both the drive signal 1 of the LED chip in a case of bright external light and the drive signal 2 of the LED chip in a case of dark external light are together continuously in an "on" state keeping the blue LED chip 10 lighted, irrespective of the external light conditions, so that the blue LED chip 10 emits light with maximum light intensity.

In the photographic or standby illumination time t2, the photographic signal is at level L indicating illumination standby. At this time, if the outside light is bright, the blue LED chip 10 is pulse-driven to emit light intermittently with a relatively large duty cycle as shown in an LED chip drive signal 1, and if the outside light is dark, the blue LED chip 10 is pulse-driven to emit light intermittently with a relatively small duty cycle as shown in an LED chip drive signal 2. In either case, the control device generates a drive signal such that a standby current flows through the blue LED chip 10 at time t2 of standby.

In this way, if the duty cycle causing pulse-drive of the blue LED chip 10 according to the external brightness is changed, an average value of the standby current changes, and a relationship of "light emission intensity of LED to external light intensity" as shown in FIG. 3B can be digitally controlled. Such a drive method has the advantageous effects that operation is simple and inexpensive, compared to an analogue system in which the drive current flowing to the LED chip is changed.

Figure 4B:
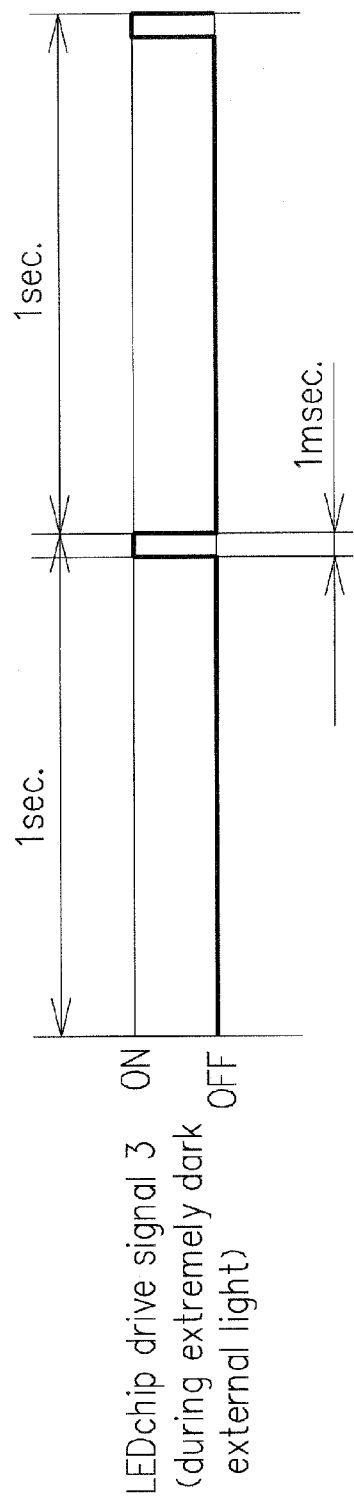
[FIG. 4B] is a time chart showing another example of the drive signal generated in the LED drive circuit.

FIG. 4B illustrates another example of a drive signal generated in an LED chip drive circuit. FIG. 4B shows the case in which external light during standby is extremely dark, and in such a case, a method may be adopted in which the blue LED chip 10 is not switched off but is lighted by an LED chip drive signal 3, for example, only 1 msec during each second as shown in the drawings. Such control has hardly affect on battery life, and also, there is an advantageous effect that the mobile phone can be easily found even in the dark.

As mentioned above, in the illumination apparatus according to the present invention, because the yellow of the resin containing the YAG is changed to look white by passing a small current to the blue LED chip during illumination standby, it is possible to use a transparent light-transmitting member with a high light transmission rate, and efficient use can be made of a light-transmitting member having a light-focusing structure and an LED light source having a light-focusing structure.

In the above-mentioned embodiments, although the present invention has been applied to the mobile phone, it may also be applied to other instruments. For example, in the event that a subject is photographed by a camera installed in a compact personal computer, the present invention can be applied to illuminate the subject. In addition, the illumination apparatus according to the present invention is not limited to the case of photography by a camera, and it may be used to illuminate any objects.

It should be noted that although the present invention has been explained with reference to an embodiment in which a blue LED chip is used, a different combination of an LED chip and a phosphor may also be used, and various modifications and changes can be made to the preferred embodiments as mentioned above.

INDUSTRIAL APPLICABILITY

Because the illumination apparatus according to the present invention makes it possible to obtain a high intensity of light emitted from the light source when a photograph is taken and extend a distance capable of being photographed, it is useful for illumination in a camera installed in a mobile phone, PDA or the like.

DESCRIPTION OF REFERENCE NUMBERS 10 blue LED chip
12 frame
14 sealing member
16 substrate
20 mother board
22 casing
24 light-transmitting member
26 exit light
27 reflection light
28 light
30 LED light source
46 image pickup device
48 subject
50 external light sensor
52 control device

The invention claimed is:
1. An illumination apparatus, comprising:
a light source including a substrate, a light emitting diode chip mounted on the substrate, and a sealing member which seals the light emitting diode chip and contains a fluorescent material; and
a control device for performing standby illumination of the light emitting diode chip by applying a standby current to the light emitting diode chip during standby illumination, the control device including an external light sensor to detect brightness of external light,
a value of the standby current being controlled according to brightness of external light detected by the external light sensor, and the value of the standby current being controlled to have a larger value for brighter external light and a smaller value for darker external light.
2. The illumination apparatus according to claim 1, wherein the control device controls the light emitting diode chip to emit during standby illumination.
3. The illumination apparatus according to claim 1, wherein the light emitting diode chip is a blue LED chip, and
wherein the fluorescent material is a YAG phosphor.
4. The illumination apparatus according to claim 1, wherein the light source has a light-focusing structure.
5. The illumination apparatus according to claim 4, wherein the light-focusing structure of the light source includes a convex lens or Fresnel lens.
6. The illumination apparatus according to claim 1, further comprising a light-transmitting member which is provided in front of the light source.
7. The illumination apparatus according to claim 6, wherein a light transmission rate of the light-transmitting member is set to be 50% or more.
8. The illumination apparatus according to claim 6, wherein the light-transmitting member has a light-focusing structure.
9. The illumination apparatus according to claim 8, wherein the light-focusing structure of the light-transmitting member includes a convex lens or Fresnel lens.

* * * * *

UNITED STATES PATENT AND TRADEMARK OFFICE
CERTIFICATE OF CORRECTION

| | | |
|---|---|---|
| PATENT NO. | : 7,859,193 B2 | Page 1 of 1 |
| APPLICATION NO. | : 11/908274 | |
| DATED | : December 28, 2010 | |
| INVENTOR(S) | : Fukasawa | |

It is certified that error appears in the above-identified patent and that said Letters Patent is hereby corrected as shown below:

At claim 2, column 8, line 19, after "emit", insert --light intermittently--.

Signed and Sealed this
Twenty-ninth Day of November, 2011

David J. Kappos
*Director of the United States Patent and Trademark Office*